United States Patent
Chen et al.

(10) Patent No.: US 6,377,645 B1
(45) Date of Patent: Apr. 23, 2002

(54) METHOD AND APPARATUS FOR CONTROLLING BIT SLIPPAGE IN HIGH-SPEED COMMUNICATIONS SYSTEMS

(75) Inventors: Howard Zehua Chen, Berkeley Heights; Keith James Monteleone, Whitehouse Station; Edward Stanley Szurkowski, Maplewood, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/307,012

(22) Filed: May 7, 1999

(51) Int. Cl.$^7$ ............................ G06F 13/00; G06F 11/00
(52) U.S. Cl. ....................... 375/372; 375/356; 370/235; 370/468
(58) Field of Search ................................. 375/356, 366, 375/368, 354, 219, 225, 257, 259, 372, 377; 370/235, 252, 428, 429, 465, 468

(56) References Cited

U.S. PATENT DOCUMENTS

| | | | | |
|---|---|---|---|---|
| 4,175,287 A | * | 11/1979 | Fuhrman | 364/900 |
| 4,824,365 A | * | 4/1989 | Loginov | 375/118 |
| 4,984,238 A | * | 1/1991 | Watanabe et al. | 370/105.1 |
| 6,298,073 B1 | * | 10/2001 | LeFever | 370/503 |

OTHER PUBLICATIONS

U.S. Patent No. 3,887,769, filed on Apr. 4, 1973 and issued on Jun. 3, 1975 to M. P. Cichetti, Jr. et al. Class: 178/69.5.
U.S. Patent No. 4,744,081, filed on May 18, 1987 and issued on May 10, 1988 to K. M. Buckland. Class: 370/100.
U.S. Patent No. 5,577,075, filed on Sep. 26, 1991 and issued on Nov. 19, 1996 to J. M. Cotton et al. Class: 375/356.

P. Langner, "SDL Data Link Specification", Lucent Technologies Inc., Microelectronics Group, Sep. 28, 1998, pp. 4–35.

\* cited by examiner

*Primary Examiner*—Chi Pham
*Assistant Examiner*—Dung X Nguyen
(74) *Attorney, Agent, or Firm*—Donald P. Dinella

(57) ABSTRACT

A method and apparatus for controlling bit slips in a high-speed, two-way, communications channel. More particularly, the entire communications system, comprising, inter alia, a receiver, a transmitter and the physical communications channel is operated as a feedback loop. That is, the detection of bit slips is performed continuously in the receiver and a bit slip signal is generated that indicates the number of bit slips and the direction, i.e., forward or backward, of the bit slip. Thus, the bit slip signal is communicated to the transmitter and certain actions are performed to introduce bit adjustments in the bit stream to eliminate the effects of any future bit slips. The bit slip signal contains an indication of the number of bit slips which have occurred, the time between bit slips, and the direction of the slip. As a function of this information from the bit slip signal, bit adjustments are made in the communications stream to correct for the bit slips and mitigate any effect in future transmission. For example, such bit adjustments include adding bits to particular data words in the bit stream or repositioning pointers used to traverse the data stream.

38 Claims, 5 Drawing Sheets

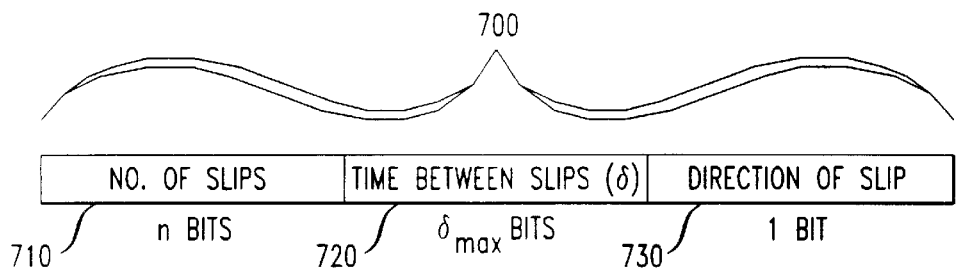
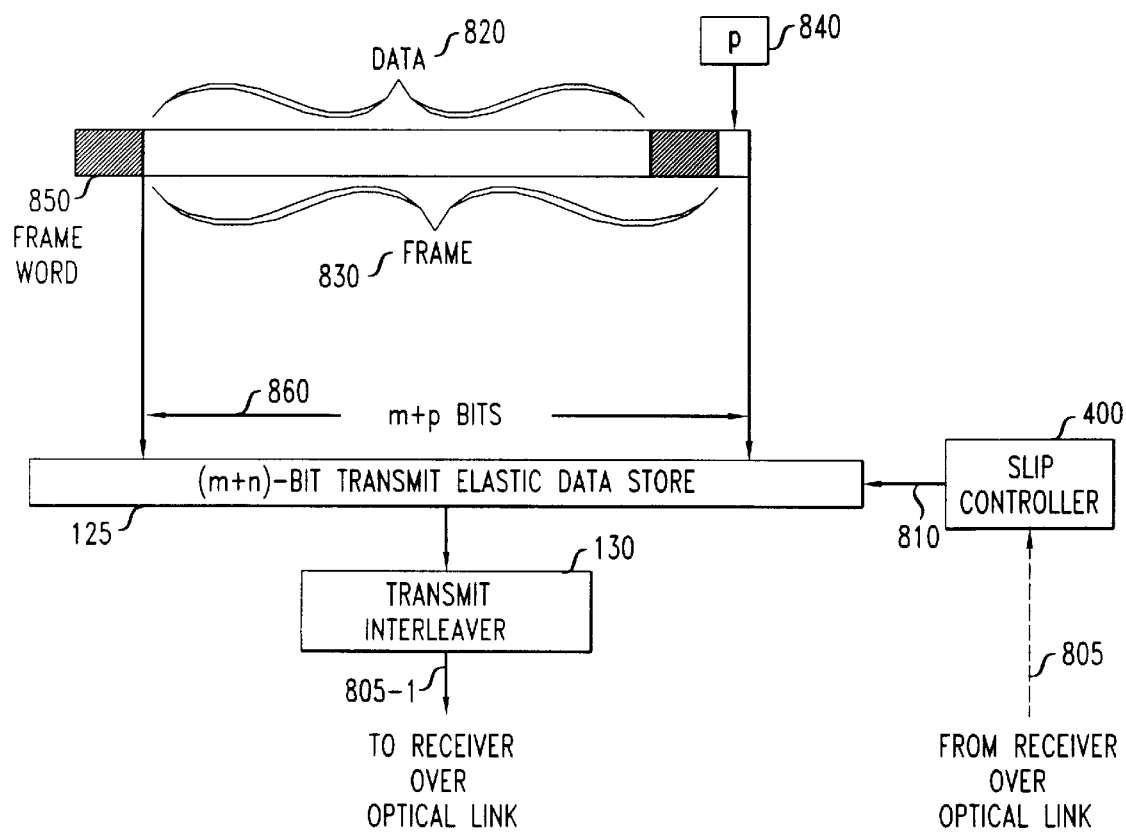

METHOD AND APPARATUS FOR CONTROLLING BIT SLIPPAGE IN HIGH-SPEED COMMUNICATIONS SYSTEMS

FIELD OF THE INVENTION

The present invention relates to communications networks and, more particularly, to controlling bit slippage in high-speed communications systems.

BACKGROUND OF THE INVENTION

Large communications networks, e.g., digital telecommunication switching networks, typically require extremely accurate clocking systems to synchronize the various time related operations performed in such communications networks. Typically, the clocking signals in these networks originate from a centralized clocking source that generates and transmits clocking signals throughout the network. Although such clocking schemes are satisfactory for most applications, they do suffer from a number of drawbacks. In particular, the reliance on a centralized clocking source leaves a distributed processing system susceptible to system-wide failures in the event of a malfunction in the clocking center. The dependence upon a single centralized clock may be minimized by utilizing a set of redundant clock sources. In such a system, there is a centralized clock center having a set of clocks that generate and transmit a group of redundant clock signals throughout the network.

For example, in well-known synchronous, time-division multiplexed data transmission systems, each device across the a transmission link has a local clock source for the timing of operations at that device. At the transmitter device, the local clock generates bit and framing pulses to align the outgoing bits in appropriate time slots, assembles frames of data, and controls the insertion of framing bits or signals which delineate successive frames. At the receiving device, the local clock of this device generates bit and framing pulses that disassemble the incoming frames and recover the transmitted bits in each of the time slots. As is well-known, transmission links, such as a cable or optical fiber, have propagation delays which create certain timing misalignments during data transmission. Further, as is well-known, clock sources (local or common) produce so-called "timing jitters" (also referred to in the art as "phase noise", "timing errors", or "wrong-slot errors") that cause misalignment of data bits, i.e., "bit slippage", in reference to certain timing markers, i.e., frames.

In low speed synchronous digital links, the timing jitters introduced from a clock source are relatively small as compared to the total period of a bit interval. Thus, the effect of the time jitter, e.g., bit slippage, can be eliminated by using a well-known phase-locked loop circuit that resides in a clock recovery circuit. However, in high-speed synchronous digital links, e.g., multi-gigabit fiberoptic links, timing jitters are caused from a variety of well-known sources (e.g., clock source imperfection, phase noise from phase-locked loops, etc.) and such timing jitters are large as compared to the total period of a bit interval. Thus, it is not uncommon in such high-speed links to incur timing jitters on the order of several bit intervals. In such cases, the phase-lock loop solution used in low speed applications will fail to follow and track the change resulting in cycles slips. These cycle slips, in turn, cause the transmitted and received data bits across the high-speed link to be misaligned with framing markers, i.e., bit slippage has occurred.

The art is replete with a variety of techniques to control bit slips. For example, U.S. Pat. No. 3,887,769 issued to M. P. Cichetti, Jr. et al. on Jun. 3, 1975, hereby incorporated herein by reference for all purposes, describes a technique which employs an elastic data bit store for frame synchronization. More particularly, this scheme utilizes a elastic data bit store to introduce a variable delay in the incoming data stream to allow a so-called frame find circuit to detect a time-shifted framing code thereby reducing bit slippage. Further, U.S. Pat. No. 4,744,081 issued to K. M. Buckland on May 10, 1998, hereby incorporated herein by reference for all purposes, describes a particular frame find circuit design in which a continuous bit slip of data words in a serial data stream are monitored for the presence of the frame word. In accordance with this scheme, all possible bit orientations are examined in a single frame until the frame word is found. Also, U.S. Pat. No. 5,577,075 issued to J. M. Cotton et al. on Nov. 19, 1996, hereby incorporated herein by reference for all purposes, describes a bit slippage technique employing a 12-bit detection window to detect a 10-bit synchronization code. Cotton's technique provides for ±1 bit slip detection and can be generalized to detect any m-bit pattern in a (m+n) bit window, where m and n are integers.

Although such prior art bit slippage schemes provide reasonable solutions to the mitigating effects of bit slippage, such schemes do not address bit slippage in a two-way high-speed communications link. That is, in these prior bit slippage schemes, the task of controlling bit slippage is entirely performed on the receiver side of the communication to the exclusion of the transmission side. Thus, in two-way high-speed communication links, even though there exists the capacity to engage the transmission side in bit slippage control such receiver-centric solutions do not engage the transmission side in the control of bit slips. Furthermore, in two-way high-speed communications systems employing elastic data bit stores, bit slips can occur at a very high rate at the receiver. As such, in order to mitigate communications errors such as frame markers slipping out of the elastic stores, the receiver-centric approaches of the prior art require the use of very large elastic stores. Since the size and complexity of the supporting bit slip circuitry is proportional to the size of the elastic store, the implementation of such communications systems becomes more complex and expensive in terms of hardware requirements.

Therefore, a need exists for improving bit slip control in a high-speed, two-way, communications link.

SUMMARY OF THE INVENTION

The present invention provides a method and apparatus for controlling bit slips in a high-speed, two-way, communications link. More particularly, in accordance with the invention, the entire communications link, comprising, inter alia, a receiver, a transmitter and the physical communications channel is operated as a feedback loop. That is, in accordance with the invention, the detection of bit slips is performed continuously in the receiver and a bit slip signal is generated that indicates the number of bit slips and the direction, i.e., forward or backward, of the bit slip. In accordance with the preferred embodiment of the invention, the bit-slip signal is communicated to the transmitter and certain actions are performed to introduce bit adjustments in the bit stream to eliminate the effects of any future bit slips. In accordance with the preferred embodiment of the invention, the bit slip signal contains an indication of the number of bit slips which have occurred, the time between bit slips, and the direction of the slip. As a function of this information from the bit slip signal, bit adjustments are made in the communications stream to correct for the bit slips and mitigate any effect in future transmission. For example, such bit adjustments include adding bits to particular data words in the bit stream or repositioning pointers used to traverse the data stream. Advantageously, in accordance with the invention, both the receiver and transmitter are actively engaged in controlling bit slippage across the communications link thereby improving the robustness and efficiency of the communications exchange.

BRIEF DESCRIPTION OF THE DRAWINGS

FIG. 7 shown an illustrative slip signal configuration in accordance with invention; and FIG. 8 shows a further embodiment of the invention for controlling bit slips in fiberoptic communications systems.

Throughout this disclosure, unless otherwise noted, like elements, blocks, components or sections in the figures are denoted by the same reference designations.

DETAILED DESCRIPTION

The present invention provides a method and apparatus for controlling bit slips in a high-speed, two-way, communications channel. More particularly, in accordance with the invention, the entire communications system, comprising, inter alia., a receiver, a transmitter and the physical communications channel is operated as a feedback loop. That is, in accordance with the invention, the detection of bit slips is performed continuously in the receiver and a bit slip signal is generated that indicates the number of bit slips and the direction, i.e., forward or backward, of the bit slip. In accordance with the preferred embodiment of the invention, the bit slip signal is communicated to the transmitter and certain actions are performed to introduce bit adjustments in the bit stream to eliminate the effects of any future bit slips. In accordance with the preferred embodiment of the invention, the bit slip signal contains an indication of the number of bit slips which have occurred, the time between bit slips, and the direction of the slip. As a function of this information from the bit slip signal, bit adjustments are made in the communications stream to correct for the bit slips and mitigate any effect in future transmission. For example, such bit adjustments include adding bits to particular data words in the bit stream or repositioning pointers used to traverse the data stream. Advantageously, in accordance with the invention, both the receiver and transmitter are actively engaged in controlling bit slippage across the communications link thereby improving the robustness and efficiency of the communications exchange.

It should be noted that for clarity of explanation, the illustrative embodiments described herein are presented as comprising individual functional blocks or combinations of functional blocks. The functions these blocks represent may be provided through the use of either shared or dedicated hardware, including, but not limited to, hardware capable of executing software. Illustrative embodiments may comprise digital signal processor ("DSP") hardware and/or software performing the operations discussed below. Further, in the claims hereof any element expressed as a means for performing a specified function is intended to encompass any way of performing that function, including, for example, a) a combination of circuit elements which performs that function; or b) software in any form (including, therefore, firmware, object code, microcode or the like) combined with appropriate circuitry for executing that software to perform the function. The invention defined by such claims resides in the fact that the functionalities provided by the various recited means are combined and brought together in the manner which the claims call for. Applicants thus regard any means which can provide those functionalities as equivalent as those shown herein.

Figure 1:
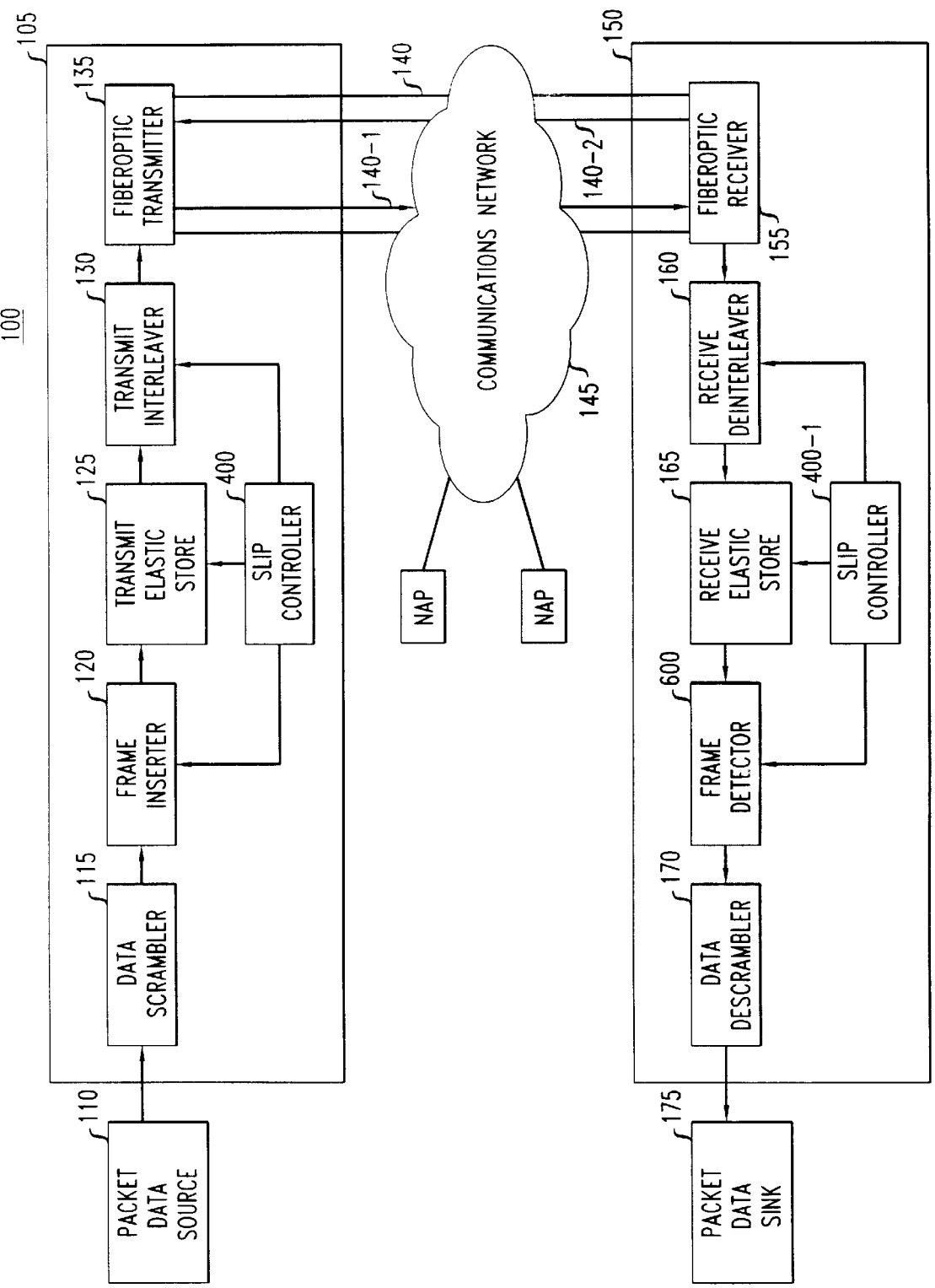
FIG. 1 shows an illustrative high-speed communications system configured in accordance with the principles of the invention.

FIG. 1 shows an illustrative high-speed communications system 100 configured in accordance with the principles of the invention. For clarity of explanation, the illustrative configuration in FIG. 1 is a high-speed fiberoptic communications systems, of course, the principles of the invention as described below apply equally to further embodiments which include other communications system arrangements. Communications system 100 comprises packet data source 110 (e.g., a end-user location or Internet Service Provider ("ISP") location) and network access point ("NAP") 105. As will be readily understood, a NAP is a member of a family of nodes (each node comprising hardware and software) that together form a high-speed network backbone. In accordance with the preferred embodiment of the invention, NAP 105 further comprises data scrambler 115, frame inserter 120, transmit elastic store 125, slip controller 400, transmit interleaver 130, and fiberoptic transmitter 135. Further, communications channel 140 (e.g., a fiberoptic cable) comprises communications links 140-1 and 140-2, respectively. Thus, communications channel 140 provides a connection between NAP 105, communications network 145 and NAP 150 to facilitate the exchange of a variety of communications (e.g., voice, data, multimedia, etc.) using well-known communications protocols.

In accordance with the preferred embodiment, NAP 150 comprises fiberoptic receiver 155, receive deinterleaver 160, slip controller 400-1, receive elastic store 165, frame detector 600, and data scrambler 170. Further, packet data sink 175 (e.g., a end-user location or ISP) is connected to NAP 150 for receiving, illustratively, a communications stream from NAP 105. As illustratively shown in FIG. 1, communications channel 140 is a two-way link having a transmission link, e.g., communications link 140-1, and a receiver link, e.g., communications link 140-2 (a so-called reverse link). As discussed previously, communications system 100 is subject to timing jitters that cause bit slips in reference to certain timing markers, i.e., frames. Illustratively, bit slips may occur in communications system 100 from a variety of sources such as: imperfections in clock sources, phase noise from frame inserter 120 or transmit interleaver 130, and/or time-dependent contractions or expansions in the length of communications channel 140, to name just s few bit slippage sources. In accordance with the invention, and as discussed in detail below, bit slips in communications system 100 are effectively handled by the cooperative operations of the receiver side and transmission side of the communications stream as exchanged over a communications link.

Figure 2:
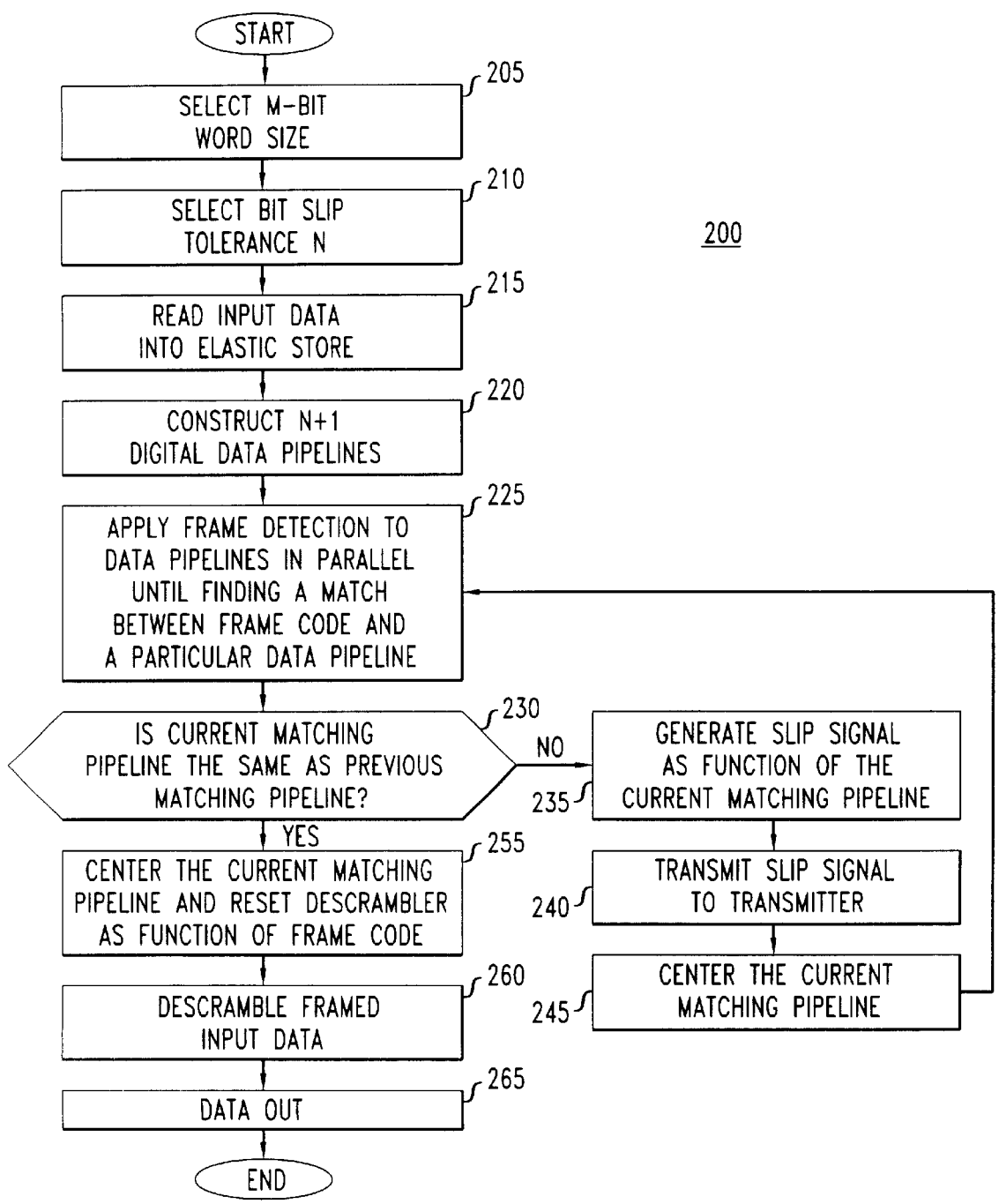
FIG. 2 is a flowchart of illustrative receiver operations performed in accordance with the invention for controlling bit slips in high-speed communications systems.

More particularly, FIG. 2 is a flowchart of illustrative receiver operations 200 performed in accordance with the invention for controlling bit slips in high-speed communications links. Operations 200 are illustratively performed, in accordance with the preferred embodiment of the invention, at the receiver side of a communication, e.g. NAP 150 of FIG. 1, exchanged across a communications channel, e.g., communications channel 140. In particular, in accordance with the invention, an m-bit word size is selected (block 205) and a bit slip tolerance "n" is selected (block 210). In accordance with the preferred embodiment of the invention, and as discussed in more detail below, the combination of the m-bit word size and bit slip tolerance n defines a (m+n)-bit register for a m-bit pattern that tolerates n bit slips. In particular, turning our attention briefly to FIG. 4, an illustrative bit register 460 is shown for m-bit pattern 470 that tolerates n bit slips.

Figure 4:
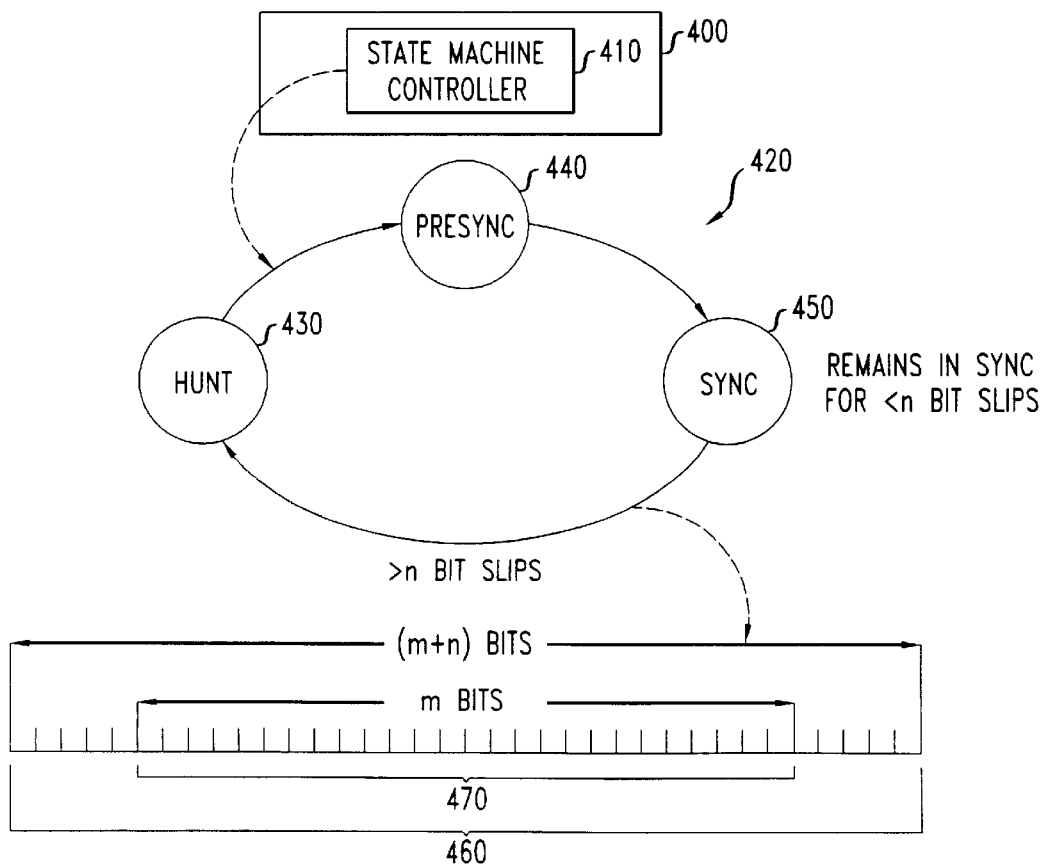
FIG. 4 shows an illustrative configuration of the slip controllers of FIG. 1 in accordance with the principles of the invention.

Further, in FIG. 4, an illustrative configuration of slip controller 400, in accordance with the invention is shown (it will be appreciated that slip controller 400-1 of FIG. 1 has a similar configuration and functionality in accordance with the invention) having state machine controller 410. In particular, FIG. 4 shows an expanded view of slip controller 400 of FIG. 1 configured in accordance with the invention. Slip controller 400 includes state machine controller 410 which controls certain operational states of slip controller 400. Illustratively, state machine controller 410 facilitates the delivery of a variety of slip controller states as a function of the detection of bit slips in accordance with the various aspects of the invention. More particularly, state machine controller 410 delivers state machine 420 having the following states: Hunt 430, Presync 440, and Sync 450.

Figure 5:
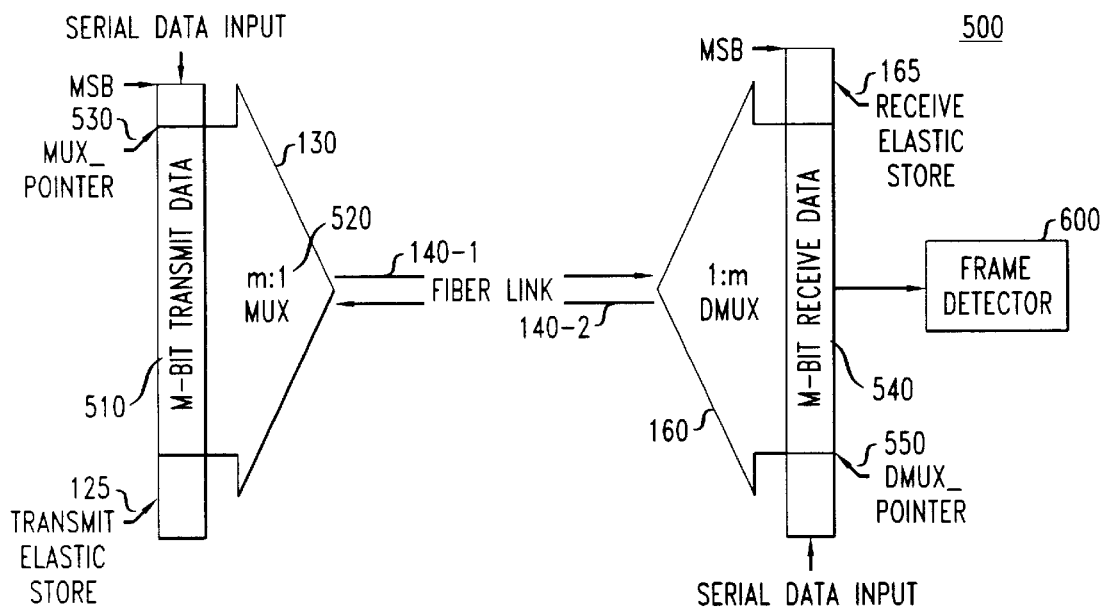
FIG. 5 shows an illustrative data alignment in the elastic stores of FIG. 1 in accordance with the principles of the invention.

The effects of the various states of state machine 420 and the controlling of bit slips in accordance with the invention are discussed below. In accordance with the preferred embodiment of the invention, on the receive side, input data is read (see, FIG. 2, block 215) into the elastic buffer, e.g., receive elastic store 165. The input data read operation is, illustratively, part of Hunt 430 state of the slip controller, e.g., slip controller 400-1. FIG. 5 shows illustrative data alignment 500 in the elastic stores of FIG. 1, i.e., transmit elastic store 125 and receive elastic store 165, respectively. As shown, on the transmit side (e.g., NAP 105), m+n bits are obtained from frame inserter 120 and are placed in transmit elastic store 125 (see, FIG. 5, transmit data 510). Thereafter, m-bits are removed from transmit elastic store 125 in response to predetermined commands from slip controller 400. Illustratively, the following pseudocode, defines an algorithm for removing the m-bits:

```
IF(no_slip = = 1) THEN
    IF(frame_insert = = 1) THEN
        Data_out = m-bit frame code
    END IF
    IF(data_insert = = 1) THEN
        Data_out = m-bits
    ENDIF
ELSE
    Decode number and direction of slips.
    Generate time-delayed or advance frame_insert and data_insert
    signals that are used to process the next data frame.
END IF
```

As the m-bits are removed they are sent to transmit interleaver 130 where the parallel m-bit words are serialized, i.e., multiplexed, into a serial bit stream 520 at, illustratively, a bit rate that is m times higher. Further, in accordance with the preferred embodiment, MUX_Pointer 530 is used to indicate the position of the m-bit words in transmit interleaver 130.

On the receive side, e.g., NAP 150, receive deinterleaver 160 produces (m+n) bits. (see, FIG. 5, receive data 540) for receive elastic store 165. Receive data 540, positioned by DMUX_Pointer 550, is taken from receive elastic store 165 in response to predetermined commands from slip controller 400-1 and passed to frame detector 600. In frame detector 600, the particular framing pattern inserted by frame inserter 120, in a well-known manner, is recovered. Such framing pattern recovery is well-known, see, e.g., the above-cited U.S. Pat. No. 4,744,081, and need not be discussed further in detail herein. In short, in accordance with the preferred embodiment, all possible bit orientations from receive deinterleaver 160 are examined until the m-bit frame word, i.e., frame marker, is located. In particular, in accordance with the preferred embodiment, the m-bit words are constructed by repeatedly taking the first m consecutive bits in the (m+n)-bit register with each repetition being defined with a single bit shift. As such, a total of (n+1) m-bit words are obtained.

Figure 6:
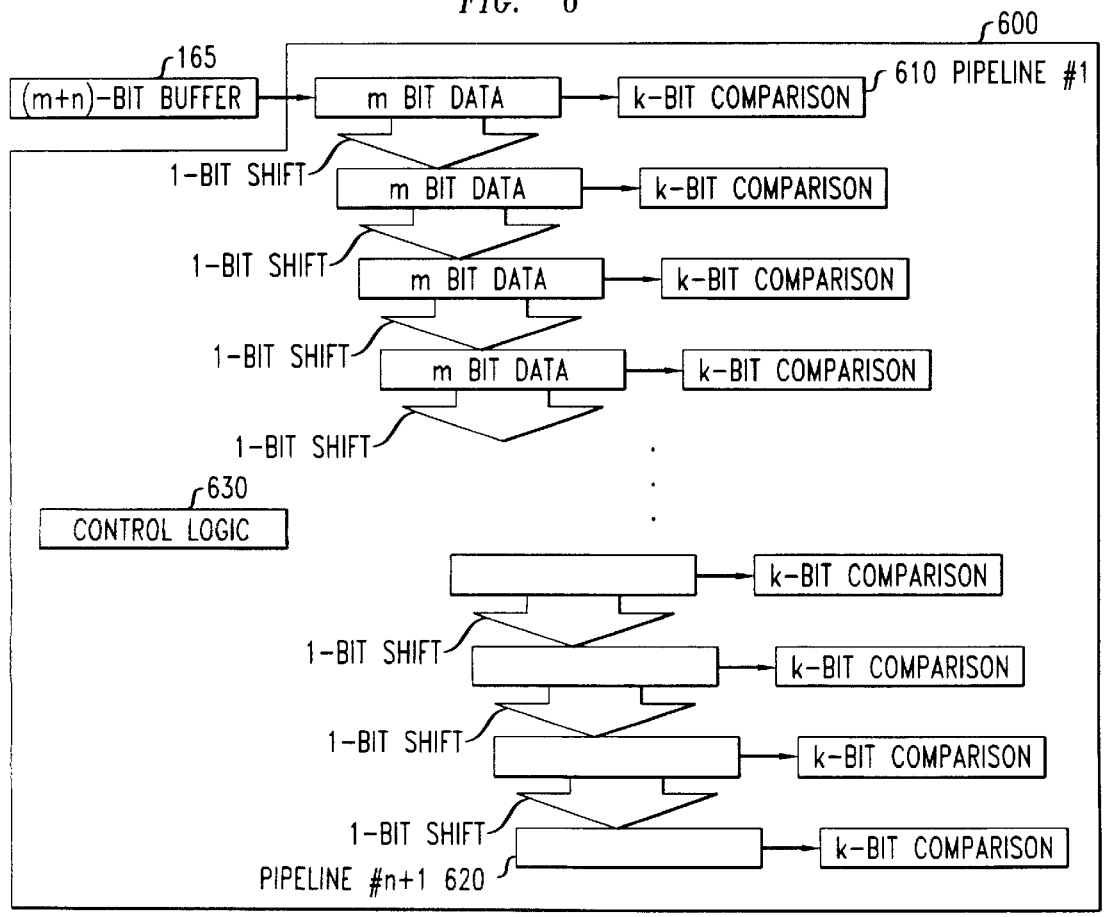
FIG. 6 shows an illustrative configuration of frame detector of FIG. 1 in accordance with the principles of the invention.

Using the input data as aligned above, a set of n+1 digital data pipelines is constructed (see, FIG. 2, block 220). In accordance with the preferred embodiment of the invention, these data pipelines are constructed as a function the m-bit frame words defined from the input data and are instrumental in the detection of slips. Illustratively, each data pipeline contains m consecutive bits. More particularly, in accordance with the invention, frame detection is applied to the data pipelines, in a parallel fashion, until a match between a frame word and a particular data pipeline (see, FIG. 2, block 225) is found. Turning our attention briefly to FIG. 6, an illustrative configuration of frame detector 600 is shown having an illustrative set of pipelines from pipeline #1 (see, FIG. 6, pipeline 610) through pipeline #n+1 (see, FIG. 6, pipeline 620) which are shown in a breakout fashion for effect and ease of comprehension. As will be appreciated, the pipelines are actually stored, illustratively, in conventional memory (e.g., RAM) in frame detector 600. Control logic 630 provides, in a well-known fashion, control features (e.g., timing, memory access, etc.) to frame detector 600.

In applying the aforementioned frame detection operation, there is always a match between the frame code, i.e., frame marker, and one of the data pipelines constructed in accordance with the invention. As such, upon detection of the matching data pipeline, in accordance with the preferred embodiment of the invention, a comparison is made to determine whether the current matching pipeline is the same as the just prior matching pipeline (see, FIG. 2, block 230). If yes, this is an indication that there has not been any bit slippage in the current bit pattern. Thus, in accordance with the preferred embodiment of the invention, the set of data pipelines are centered around the current matching data pipeline (see, FIG. 2, block 255) for proper configuration of the pipelines for the next cycle of frame detection. After centering the pipelines, the descrambler is reset as a function of the frame code (see, FIG. 2, block 255) and the relevant framed input data (i.e., the input data that follows the frame code) is descrambled (see, FIG. 2, block 260) from the current bit stream and output (see, FIG. 2, block 265) from the receiver.

Alternatively, in accordance with the preferred embodiment of the invention, if the current and prior data pipelines do not match, this is an indication that at least one bit slip has occurred in the current bit pattern. In accordance with the invention, a slip signal is generated as a function of the current matching pipeline (see, FIG. 2, block 235) and the generated slip signal is transmitted back to the transmitter side, e.g., NAP 105, of the communications channel (see, FIG. 2, block 240). In accordance with the preferred embodiment, the slip signal is carried back to the transmitter over the so-called reverse link, e.g., link 140-2 of FIG. 1, of the two-way high-speed communications channel, e.g., communications channel 140 of FIG. 1. As before, in accordance with the preferred embodiment of the invention, the set of data pipelines are centered around the current matching data pipeline (see, FIG. 2, block 245) for proper configuration of the pipelines for the next cycle of frame detection.

Advantageously, in accordance with the invention, the transmitter makes certain adjustments in the communications stream such that future bit slips can be reduced and/or eliminated. Illustratively, turning our attention to the preferred embodiment of FIG. 1, the slip signal carried back to NAP 105 over communications link 140-2 is examined by slip controller 400. Based upon the slip signal characteristics, slip controller 400 will determine a positioning of MUX_Pointer 530 (see, FIG. 5) as means to reduce future bit slips on the receiver side, e.g., NAP 150. Illustratively, MUX_pointer 530 can be generated using a bit-counter and can be moved relative to its previous position by increasing or decreasing the count limit of the bit-counter. Alternatively, slip controller 400 can position the next data frame as a function of MUX_Pointer 530 by generating signals, e.g., frame_insert and data_insert as detailed above, that differ from their respective previous positions in accordance with the slip signal and a control signal. Further, in accordance with the preferred embodiment, slip controller 400 will implement a series of operations that will move DMUX_Pointer 550 (see, FIG. 5) towards the center of receive elastic store 165, where in Synch 450 state (see, FIG. 4), frame detector 600 will provide the greatest degree of protection against bit slips in the future.

Figure 3:
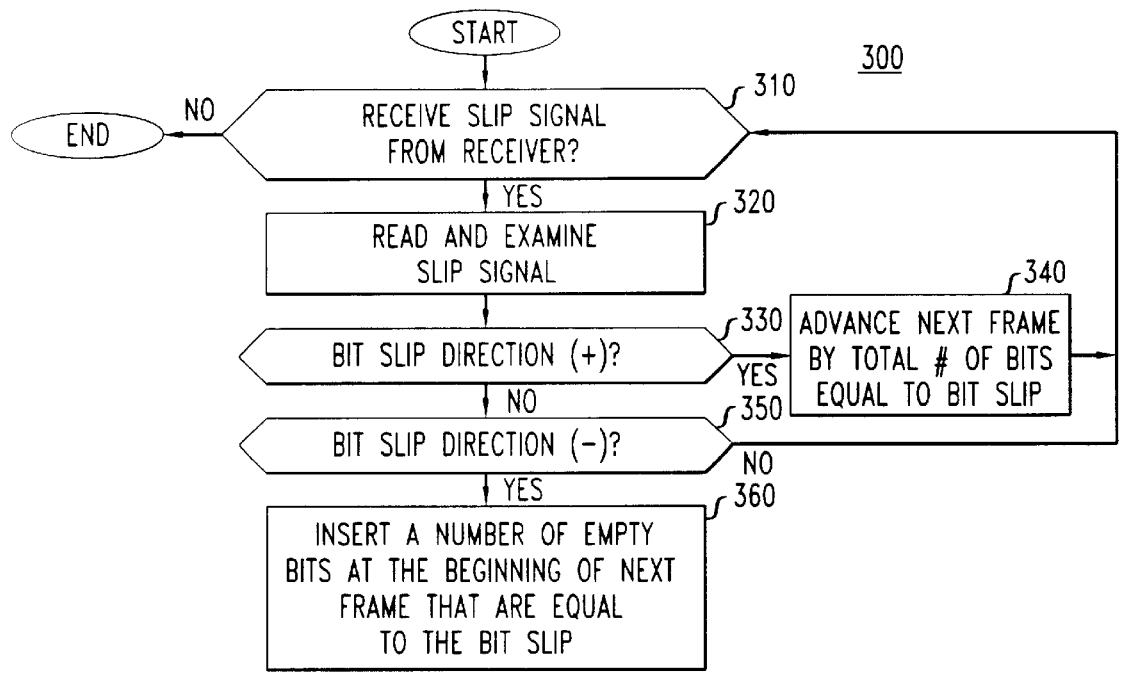
FIG. 3 is a flowchart of illustrative transmitter operations performed in accordance with the invention for controlling bit slips in high-speed communications systems.

More particularly, FIG. 3 is a flowchart of illustrative transmitter operations 300 performed in accordance with the invention for controlling bit slips in high-speed communications systems. In particular, the slip signal generated by the receiver, as described above, and communicated back to the transmitter is received (see, FIG. 3, block 310). The slip signal is read and examined (see, FIG. 3, block 320), illustratively, by slip controller 400. If the slip signal contains an indication (see, FIG. 3, block 330) that the bit slip was positive, i.e., the current matching pipeline during the above-described frame detection operations was forward of the previous matching pipeline, the next frame is advanced by a total number of bits that equal the total bit slip (see, FIG. 3, block 340). Advancement of the next frame ensures that this next frame will be detected and descrambled properly. However, if the slip signal contains an indication (see, FIG. 3, block 350) that the bit slip was negative, i.e., the current matching pipeline during the above-described frame detection operations was behind the previous matching pipeline, a number of bits are inserted at the beginning of the next frame that equal the total bit slip (see, FIG. 3, block 360). Advantageously, in accordance with the invention, both the receiver and transmitter are actively engaged in controlling bit slippage across the communications link thereby improving the robustness and efficiency of the communications exchange.

An illustrative slip signal configuration 700, in accordance with invention, is shown in FIG. 7. In accordance with the preferred embodiment, slip signal configuration 700 contains at least three parts: number of slips 710 expressed, illustratively, in n bits, time between slips ($\delta$) 720, and direction of slip 730 expressed, illustratively, as a single bit. Further, if two consecutive bit slips occur over an interval longer than some predetermined maximum frame count, $\delta$ is set to some predetermined bit count $\delta_{max}$. As described above, in accordance with the invention, slip controller 400 strives to move DMUX_Pointer 550 (see, FIG. 5) by $|(m+n)/2-|$ bits over a specific number of frames $\alpha$. In other words, the bit slips over $\delta$ frames are transmitted back to the transmitter where action is taken over $\alpha$ frames to "feed forward" the change to the receiver, i.e., the repositioning of MUX_Pointer 530 (see, FIG. 5) as described above. Advantageously, the feed forward bit slip using MUX_Pointer 530 should result in a locking of DMUX_Pointer 550 near or at the center of receive elastic store 165. Thus, in accordance with the invention, the entire two-way high-speed communications channel, e.g., communications channel 140, operates as a delay-locked loop. As a result, the precision of the clocks in, e.g., transmitter 135 and receiver 155, can be relaxed, as long as receiver 155 can track the position of the frame marker in the data pipelines. The slip signal feedback to transmitter 535, in accordance with the invention, ensures that receive elastic store 165 does not have to be infinitely large to guarantee positive frame marker detection. Therefore, both the transmitter and receiver benefit, in accordance with the invention, from the transmission history stored in the data pipelines thereby resulting in a more reliable communications link.

In accordance with the invention, the above-described operations provide an effective technique for controlling bit slips in high-speed communications links. As will be readily understood, communications system 100 as configured can be used for data transmission, in accordance with the invention, using such well-known communications standards as Asynchronous Transfer Mode ("ATM"), Internet Protocol ("IP"), Point-to-Point Protocol ("PPP") and High-Level Data Link Control ("HDLC"). In addition, communications system 100 as configured can also be used for data transmission in accordance with the so-called Simple Data Link ("SDL") protocol developed by Lucent Technologies Inc. SDL is a simple point-to-point data link framing protocol and is described in detail in P. Langner, "SDL Data Link Specification", Lucent Technologies Inc., Microelectronics Group, Sep. 28, 1998, hereby incorporated herein by reference for all purposes.

For example, FIG. 8 shows a further embodiment of the invention for controlling bit slips in such fiberoptic communications systems. More particularly, the illustrative example of FIG. 8 is directed to a scenario in which p bits are deleted, i.e., a bit slip has occurred, during data communications between a receiver site and a transmitter site. Thus, if left uncorrected, the further transmission of frame word 850 and data 820 from transmit elastic store 125 would be in error. However, in accordance with the invention, the bit slip is detected, as described in detail above, and slip signal 810 is communicated back to the transmitter site via communications link 805 through slip controller 400. After examining slip signal 810, slip controller 400, in accordance with the invention, initiates a series of operations that add a number of bits 840, i.e., a number of empty bits, to the front of transmit data frame 830. The number of bits 840 added are less than or equal to the total bits lost due to the bit slip in order to mitigate the effect of any future bit slips. As will be appreciated, in the framed, synchronous, digital communications link of this embodiment, data bits are framed with a predetermined framing word, e.g., frame word 850, that may comprise one or multiple bit patterns. Thus, in accordance with the embodiment, if a m-bit word is used as the framing pattern, the slip signal of $(n+\delta_{max}+1)$ bits can be immediately appended to the frame word, or can be placed at any other predetermined location in the frame. Illustratively, in high-speed digital communications, e.g., SONET, a frame word typically occurs ever 125 $\mu$s regardless of the actual bit rate. As a result, the transmission overhead of adding the slip signal, in accordance with the invention, is negligible but provides the significant advantages for controlling bit slips in such high-speed communications systems as detailed previously. Thus, in terms of the embodiment of FIG. 8, transmit elastic store 125 contains the corrected bit pattern 860 (i.e., m+p bits) for transmission by transmit interleaver 130 over optical link 805-1 without any transmission errors introduced by the prior bit slippage in the communications exchange.

As detailed above, the present invention can be embodied in the form of methods and apparatuses for practicing those methods. The invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The invention can also be embodied in the form of program code, for example, in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Furthermore, all examples and conditional language recited herein are principally intended expressly to be only for pedagogical purposes to aid the reader in understanding the principles of the invention and the concepts contributed by the Applicants to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flowcharts, flow diagrams, state transition diagrams, pseudocode, program code, and the like represent various processes which may be substantially represented in computer readable medium and so executed by a computer, machine, or processor, whether or not such computer, machine, or processor, is explicitly shown.

The foregoing merely illustrates the principles of the present invention. It will thus be appreciated that those skilled in the art will be able to devise various arrangements which, although not explicitly described or shown herein, embody the principles of the invention and are included within its spirit and scope.

We claim:

1. A method of controlling a communications channel comprising:
   monitoring a communications exchange across the communications channel, the communications channel providing a connection between a transmitter and a receiver, the communications exchange including a plurality of bits;
   storing the plurality of bits in a buffer;
   constructing a plurality of data pipelines from a portion of the plurality of bits;
   detecting a current match between a frame code and a particular one data pipeline of the plurality of data pipelines; and
   comparing the currently matching pipeline with a prior matching data pipeline, and (a) if a match occurs, outputting the portion of the plurality of bits, otherwise
   (b) if no match occurs, then
      (i) generating a slip signal as a function of the currently matching pipeline,
      (ii) providing the slip signal to the transmitter,
      (iii) centering the plurality of data pipelines around the currently matching pipeline, and
      (iv) adjusting a rate of the communications exchange as a function of the slip signal.

2. The method of claim 1 wherein the slip signal includes an indication of a total number of bits slips occurring in the communications exchange, a elapsed time between consecutive bit slips, and a bit slip direction of at least one bit slip.

3. The method of claim 2 wherein the frame code is a fixed word size of m-bits and is inserted by the transmitter into the plurality of bits.

4. The method of claim 3 wherein the detecting the current match operation is performed in a parallel fashion across the plurality of data pipelines.

5. The method of claim 3 wherein the providing the slip signal operation comprises transmitting the slip signal across a reverse communications link from the receiver to the transmitter, the reverse communications link being part of the communications channel.

6. The method of claim 5 wherein the adjusting the rate of the communications exchange is performed by the transmitter.

7. The method of claim 6 further comprising the operation of inserting, by the transmitter, a number of bits into the plurality of bits when the bit slip direction of the at least one bit slip is positive.

8. The method of claim 7 wherein the number of bits inserted is determined as a function of the total number of bit slips indicated in the slip signal.

9. The method of claim 2 wherein the communications channel includes at least one fiberoptic cable.

10. The method of claim 9 wherein the plurality of data pipelines are constructed as a function of a bit slip tolerance level.

11. The method of claim 2 further comprising:
    adjusting a position of a pointer in the buffer as a function of the slip signal, the pointer used for selecting the portion of the plurality of bits.

12. A method of exchanging and controlling communications between a receiving location and a transmitting location, the receiving location and transmitting location being connected by at least one communications channel, the method comprising:
    monitoring the communications between the transmitting location and the receiving location as exchanged over the communications channel, the communications including a plurality of frames, each frame of the plurality of frames including a plurality of bits;

storing the plurality of frames in a buffer;

constructing a plurality of data pipelines as a function of a select number of the plurality of frames;

detecting a current match between a frame code and a particular one data pipeline of the plurality of data pipelines; and comparing the currently matching pipeline with a prior matching data pipeline, and (a) if a match occurs, outputting at least a portion of the plurality of bits of the corresponding frame, otherwise (b) if no match occurs, then (i) generating a slip signal as a function of the currently matching pipeline, (ii) providing the slip signal to the transmitting location, (iii) centering the plurality of data pipelines around the currently matching pipeline, and (iv) adjusting the communications exchange as a function of the slip signal.

13. The method of claim 12 wherein the slip signal includes an indication of a total number of bits slips occurring in the communications exchange, a elapsed time between consecutive bit slips, and a bit slip direction of at least one bit slip.

14. The method of claim 13 wherein the detecting the current match operation is performed in a parallel fashion across the plurality of data pipelines.

15. The method of claim 14 wherein the providing the slip signal operation comprises transmitting the slip signal across a reverse communications link from the receiving location to the transmitting location, the reverse communications link being part of the communications channel.

16. The method of claim 15 wherein the plurality of data pipelines are constructed as a function of a bit slip tolerance level.

17. The method of claim 14 further comprising the operation of inserting, from the transmitting location, a number of bits into the plurality of bits of the corresponding frame when the bit slip direction of the at least one bit slip is positive.

18. The method of claim 14 further comprising the operation of inserting, from the transmitting location, a number of bits into the plurality of bits in a next frame of the plurality of frames.

19. The method of claim 18 wherein the frame code is a frame word occurring at a fixed interval in the communications exchange across the communications channel.

20. An apparatus for exchanging a communications signal across at least one communications channel, the apparatus comprising:

a receiver for receiving the communications signal, the communications signal including a plurality of frames;

a deinterleaver for identifying and aligning at least one plurality of bits from the plurality of frames;

a elastic store buffer for storing the plurality of bits;

a frame detector detecting a current match between a frame code and a particular one data pipeline of a plurality of data pipelines, the plurality of data pipelines being generated as a function of the plurality of bits;

a slip controller for comparing the currently matching pipeline with a prior matching data pipeline, and (a) if a match occurs, outputting at least a portion of the plurality of bits, otherwise (b) if no match occurs, then (i) generating a slip signal as a function of the currently matching pipeline, (ii) providing the slip signal to a transmitter having access to the communications channel, the transmitter being separate from the apparatus, (iii) centering the plurality of data pipelines around the currently matching pipeline, and (iv) adjusting the communications signal as a function of the slip signal; and a data descrambler for outputting the portion of the plurality of bits from the apparatus.

21. The apparatus of claim 20 wherein the slip signal includes an indication of a total number of bits slips, a elapsed time between consecutive bit slips, and a bit slip direction of at least one bit slip.

22. The apparatus of claim 21 wherein the frame code is a fixed word size of m-bits and is inserted by the transmitter into the communications signal.

23. The apparatus of claim 22 wherein the adjusting the communications signal includes inserting, by the transmitter, a number of bits into at least one frame of the plurality of frames when the bit slip direction of the at least one bit slip is positive.

24. The apparatus of claim 23 wherein the number of bits inserted is determined as a function of the total number of bit slips indicated in the slip signal.

25. An apparatus for exchanging a communications signal across at least one communications channel, the apparatus comprising:

a data scrambler for receiving data for transmission by the apparatus, the data comprising a plurality of bits;

a frame inserter for inserting a frame code within the plurality of bits;

a elastic buffer for storing the plurality of bits;

a interleaver for selecting a portion of the plurality of bits;

a transmitter for transmitting the portion of the plurality of bits in the communications signal; and a slip controller for receiving a slip signal, the slip signal being generated in a receiver and transmitted over the communications channel to the apparatus, and adjusting the communications signal as a function of the slip signal.

26. The apparatus of claim 25 wherein the slip signal is generated by constructing a plurality of data pipelines from the portion of the plurality of bits, detecting a current match between a frame code and a particular one data pipeline of the plurality of data pipelines, and comparing the currently matching pipeline with a prior matching data pipeline.

27. The apparatus of claim 26 wherein the slip signal includes an indication of a total number of bits slips, a elapsed time between consecutive bit slips, and a bit slip direction of at least one bit slip.

28. The apparatus of claim 27 wherein the frame code is a fixed word size of m-bits.

29. The apparatus of claim 28 wherein the adjusting the transmission rate includes inserting a number of bits into the plurality of bits when the bit slip direction of the at least one bit slip is positive.

30. The apparatus of claim 29 wherein the number of bits inserted is determined as a function of the total number of bit slips indicated in the slip signal.

31. An apparatus for exchanging a digital signal between at least two communications devices, the digital signal being produced by, monitoring a communications exchange across a communications channel, the communications channel providing a connection between the at least two communications devices, the communications exchange including a plurality of bits, storing the plurality of bits in a buffer, constructing a plurality of data pipelines from a portion of the plurality of bits, detecting a current match between a frame code and a particular one data pipeline of the plurality of data pipelines, comparing the currently matching pipeline with a prior matching data pipeline, and (a) if a match occurs, outputting the portion of the plurality of bits, otherwise (b) if no match occurs, then (i) generating a slip signal as a function of the currently matching pipeline, (ii) providing the slip signal to a particular one of the two communications devices, (iii) centering the plurality of data pipelines around the currently matching pipeline, and (iv) adjusting the digital signal as a function of the slip signal, and applying the digital signal to the communications channel, the apparatus comprising:

a receiver for receiving the digital signal from the communications channel, and recovering the plurality of bits from the digital signal.

32. The apparatus of claim 31 wherein the slip signal includes an indication of a total number of bits slips, a elapsed time between consecutive bit slips, and a bit slip direction of at least one bit slip.

33. The apparatus of claim 32 wherein the communications channel is a fiberoptic link.

34. A machine-readable medium having stored thereon a plurality of instructions, the plurality of instructions including instructions that, when executed by a machine, cause the machine to perform of a method for exchanging and controlling a communications signal between a receiving location and a transmitting location, by monitoring the communications signal as exchanged over a communications channel, the communications signal including a plurality of frames, each frame of the plurality of frames including a plurality of bits, storing the plurality of frames in a buffer, constructing a plurality of data pipelines as a function of a select number of the plurality of frames, detecting a current match between a frame code and a particular one data pipeline of the plurality of data pipelines, and comparing the currently matching pipeline with a prior matching data pipeline, and (a) if a match occurs, outputting at least a portion of the plurality of bits of the corresponding frame, otherwise (b) if no match occurs, then (i) generating a slip signal as a function of the currently matching pipeline, (ii) providing the slip signal to the transmitting location, (iii) centering the plurality of data pipelines around the currently matching pipeline, and (iv) adjusting the communications signal as a function of the slip signal.

35. The machine-readable medium of claim 34 wherein the slip signal includes an indication of a total number of bits slips, a elapsed time between consecutive bit slips, and a bit slip direction of at least one bit slip.

36. The machine-readable medium of claim 35 wherein the frame code is a fixed word size of m-bits and is inserted into a particular one frame of the plurality of frames.

37. The machine-readable medium of claim 36 including further instructions such that the adjusting the communications signal operation includes inserting, at the transmitting location, a number of bits into at least one frame of the plurality of frames when the bit slip direction of the at least one bit slip is positive.

38. The machine-readable medium of claim 37 wherein the number of bits inserted is determined as a function of the total number of bit slips indicated in the slip signal.

* * * * *